United States Patent [19]

Gewecke

[11] Patent Number: 5,071,684

[45] Date of Patent: Dec. 10, 1991

[54] TRIM ATTACHMENT FOR VEHICLE WHEELS

[76] Inventor: Danny E. Gewecke, 3938 Orange Ave., Covina, Calif. 91722

[21] Appl. No.: 438,181

[22] Filed: Nov. 20, 1989

[51] Int. Cl.[5] .................. B21D 53/30; B60B 7/00
[52] U.S. Cl. ........................... 428/31; 152/513; 152/544; 301/37 T
[58] Field of Search ............ 428/31; 152/513, 544; 301/37 T, 37 TC

[56] References Cited

U.S. PATENT DOCUMENTS

| | | | |
|---|---|---|---|
| 848,017 | 3/1907 | Ebner | 152/544 X |
| 1,411,544 | 4/1922 | Whiting | 301/37 TC |
| 2,709,472 | 5/1955 | Hofweber | 301/37 T |
| 2,913,034 | 11/1959 | Wall | 152/513 |
| 3,077,219 | 2/1963 | Solomon | 152/513 |
| 3,086,216 | 4/1963 | Brooks et al. | 428/31 X |
| 3,089,731 | 5/1963 | Barnes | 301/37 T |
| 3,382,908 | 5/1968 | Palmquist et al. | 428/31 X |
| 4,344,653 | 8/1982 | Sheldon | 428/31 X |
| 4,982,540 | 1/1991 | Thompson | 52/716 X |

Primary Examiner—Henry F. Epstein
Attorney, Agent, or Firm—William H. Maxwell

[57] ABSTRACT

A decorative trim attachment for universal application to vehicle wheels and comprised of an elongated member of flexible material installed between the wheel rim and tire bead by deflating the tire without removal from the wheel, characterized by a bead of selected color integral with a fin member for wheel-tire anchorage.

20 Claims, 1 Drawing Sheet

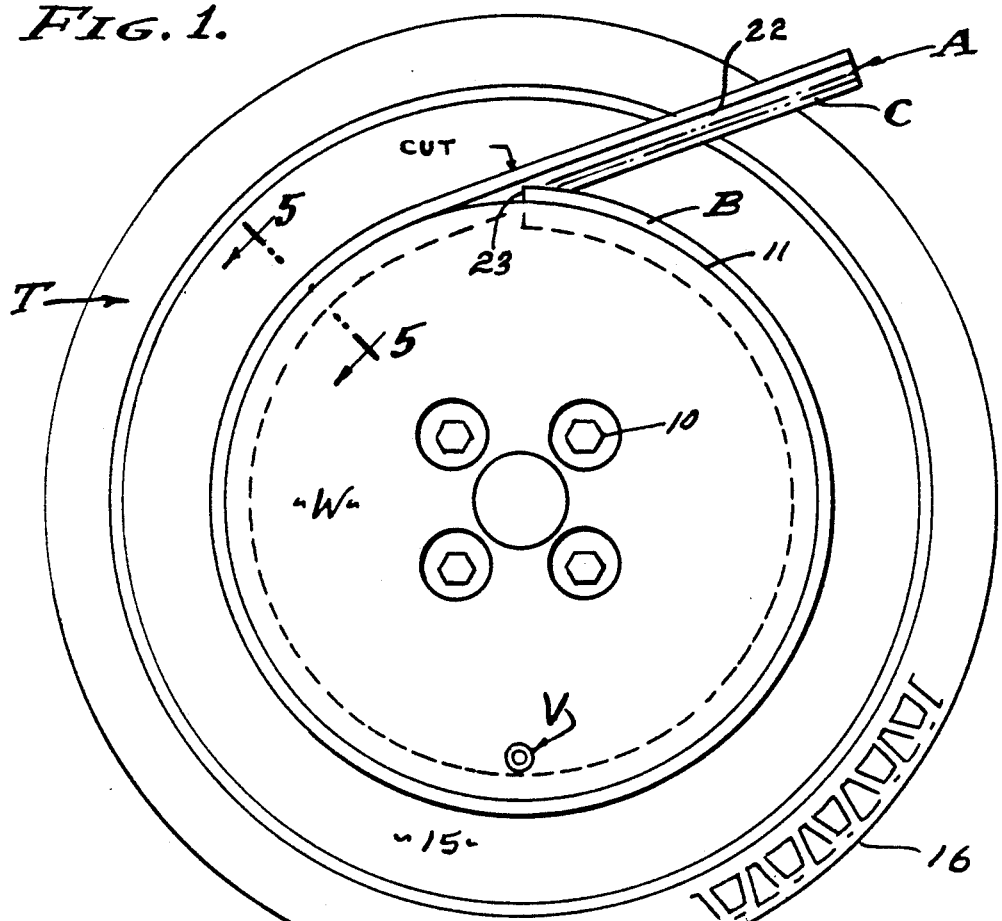
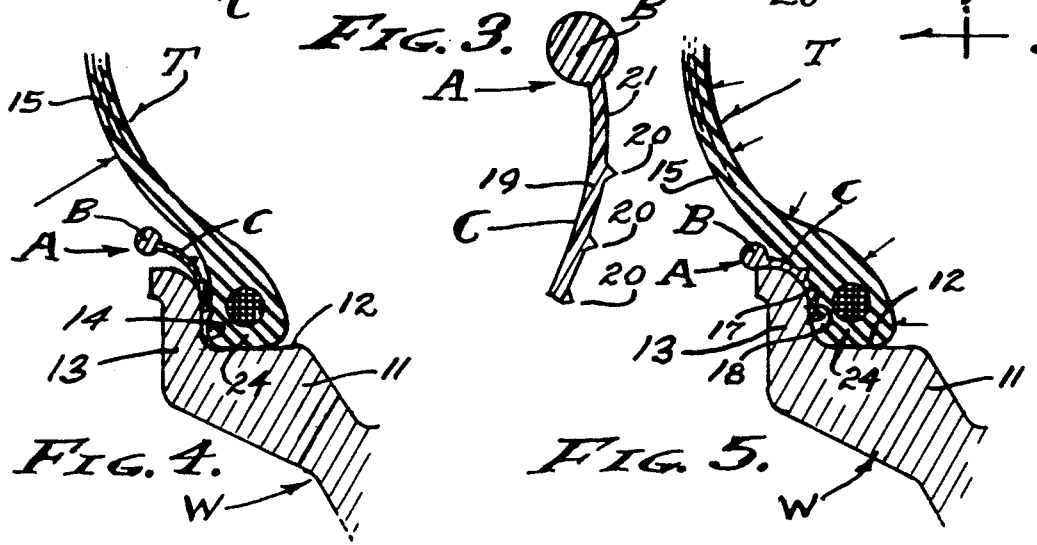

TRIM ATTACHMENT FOR VEHICLE WHEELS

BACKGROUND OF THE INVENTION

This invention relates to an ornamental ring for attachment to vehicle wheels as a trim element defining the wheel diameter at the bead zone of the tire. Heretofore, complete rings have been applied to wheels in various ways, independent of hubcaps and the like, and made of plated hard metals and plastics. And since the wheel diameters vary so must the prior art ring diameters, it being a general object of this invention to provide a universally applicable trim attachment for vehicle wheels, replacing the prior art wheel rings at less expense and with added decoration.

Heretofore, wheel rings have been attached to the wheel at or near the perimeter thereof, by means of fasteners such as screws, snaps and friction grips. And, in each instance the wheel ring and fastener system has been made specifically for the particular wheel configuration and its specific diameter. On the contrary, it is an object of this invention to provide a wheel attachment that instals between the wheel and tire without resort to fasteners such as screws, snaps or friction devices that heretofore have gripped the wheel. With the present invention the trim attachment is simply inserted between the wheel rim and tire with a decorative bead thereof exposed as ornamentation.

In view of the foregoing, it is an object of this invention to anchor a trim attachment with a bead portion thereof exposed at the juncture of the wheel rim and tire, without resort to the prefabrication of complete rings. Accordingly, the article of the present invention is a flexible elongated element of uniform cross section adapted to be extruded at minimal cost, and thereafter cut to length during installation thereof on a wheel and tire mount, so as to extend coextensively around the wheel rim perimeter. In practice, this trim attachment is extruded of flexible plastic material dyed to the desired color, and which can be easily cut to length by a sharp instrument or knife. Accordingly, this trim attachment can be cut to the circumferential dimension of any wheel.

It is also an object of this invention to provide means for securely anchoring this trim attachment in working position between the wheel and tire, without removal of the tire mounted on the wheel. A characteristic feature of this invention is a fin member integral with an ornamental bead and which inserts between the wheel rim and tire bead. And an unobvious feature of this invetnion is that the fin member is inserted into anchored position between the wheel rim and tire bead without removal of the tire, tire bead, from the wheel rim, simply by deflating the tire.

In practice, the value core of the tire is removed so that the tire assumes atmospheric pressure within. Accordingly, the side wall of the tire is easily manipulated, rotated inwardly from of the rim, from the perimeter of the wheel rim, thereby establishing a space into which the aforesaid fin member of the trim attachment is inserted, all without restriction. When insertion is completed, and the trim attachment cut to a length coincidental with the rim circumference, the valve core is replaced and the tire inflated as required.

It is still another object of this invention to provide anchor means that ensures securement to the trim attachment in the aforesaid position. To this end the trim attachment is extruded with anchor ribs of sharp configuration to bear into the depressible surface of the tire. The tire surface covering the bead area thereof opposed to the wheel rim is depressible to the extent that it will yield to sharp relatively small anchor ribs, as will be described. In carrying out this invention, this trim attachment is extruded of a semi hard and flexible plastic such as polypropylene or the like, whereby conformity to wheel diameter and tire cross section is inherent. Accordingly, a feature is conformity of this trim attachment to the space occupied thereby between the wheel rim and bead area of the tire, with the ornamental bead of the rim attachment exposed closely adjacent to the juncture of the wheel and tire. It is the pressure exerted by the tire inflation that seals the tire bead with the wheel rim and that simultaneously captures the fin member of the trim attachment, all without adverse effect on the seal.

The use of this trim attachment as above described does not preclude the use of inner tubes, wheel balance weights, and hub caps etc. Since plastic is sensitive to heat, there will be an optimum temperature (about 70°) facilitating installation, in which case both the mounted wheel-tire and trim attachment should be handled at an optimum temperature for proper flexibility of the trim attachment. As to the accomodation of wheel balance weights, the trim attachment can be notched as circumstances require to receive such weights installed on the wheel rim. Or alternately, weights can be applied adhesively to the wheel rim. However, it is possible to employ some types of balance weights of the clip-on type.

SUMMARY OF THE INVENTION

The trim attachment disclosed is universal in its application to all wheels and provides ornamentation in the form of a colored bead disposed between the wheel rim and side wall of the tire mounted thereon. By deflating the tire, a space is established by manipulation to receive a fin member that carries the ornamental bead. The trim attachment is manufactured as a continuous extrusion cut to length adequate for encompassing any wheel rim for which it is intended to decorate. The extrusion is flexible and such as to be easily cut to any circumferential length as may be required. And anchor means in the form of a fin member inserts between the wheel rim and tire bead without removal of the tire from the wheel and without affecting the air seal at the wheel rim and tire bead when the tire is reinflated.

The foregoing and various other objects and features of this invention will be apparent and fully understood from the following detailed description of the typical preferred forms and applications thereof, throughout which description reference is made to the accompanying drawings.

BRIEF DESCRIPTION OF THE DRAWINGS

FIG. 1 is an outside view of a vehicle wheel with the trim attachment of the present invention shown in the process of installation.

FIG. 2 is a side view of the trim attachment as it is prepared.

FIG. 3 is an enlarged detailed sectional view taken as indicated by line 3—3 on FIG. 2.

FIG. 4 is an enlarged fragmentary view taken through the wheel and tire mounting during installation of the trim attacment.

And FIG. 5 is a view similar to FIG. 4 and taken as indated by line 5—5 on FIG. 1.

PREFERRED EMBODIMENT

The trim attachment A herein disclosed is a decorative article adapted to be inserted into anchored position between the wheel rim and tire of an automotive vehicle, for ornamental value. As shown in FIG. 1 of the drawings, a wheel W remains secured to the vehicle axle by means of lug nuts 10 or the like, and a tire T remains mounted on the wheel, it being a feature of this invention that the wheel can remain on the vehicle and that the tire remains on the wheel. As shown, the trim attachment A is installed at the juncture of the wheel rim and tire side wall, to establish a decorative line of color defining the wheel diameter. Obviously, the wheel is removed from the ground level for making the trim attachment installation.

In accordance with this invention, the trim attachment A is a flexible member of elongated configuration having an enlarged bead portion B and a thin anchor portion C, the former to be exposed for ornamentation, and the latter to be clamped between the wheel rim and tire casing for securement in working position.

The wheel W rotates on an axle (not shown) and is secured thereto by the nuts 10, and it is comprised of a rim 11 with opposite tire bead seats 12 (one of which is detailed in FIGS. 4 and 5) to receive and seal with the tire bead. Also, at opposite peripheries of the rim 11 there is an inwardly disposed flange 13 (one of which is shown) to capture and seal with the tire bead. The seat 12 is of cylindrical form concentric with the wheel axis, while the flange 13 is a radial continuation of the rim, with a radiused transition therebetween. The periphery of the flange 13 is defined by an outwardly turned radius 14 that permits the side wall of the tire to flare outwardly and radially from the wheel rim 11.

The tire T is mounted on, and remains mounted on the rim 11 of the wheel W with a bead portion 24 reinforced by a bundle of structural wire, and confined to the seat 12 and flange 13 to seal therewith when the tire is inflated. Extending outwardly and radially from the bead portion 24 there is a side wall 15 that carries a tread portion 16. The cross sectional configuration of tires vary, a conventional tire cross section being shown. Characteristically, the outside surface 17 of the bead portion 24 conforms to the inside surface 18 of the flange 13, and between which a fin member of the trim attachment is inserted, as will be described. The usual practice of mounting a tire T on a wheel W involves mounting lubricant, which in practicing this invention is cleaned away from the tire surface 17 and flange surface 18 where the fin member is to be inserted.

In accordance with this invention, the trim attachment A is comprised of the bead portion B and the anchor portion C, integrally formed as an elongated extrusion of plastic that is flexible so as to comform to the wheel and tire configurations in the transition of the bead portion surface 17 and flange surface 18 into the curvature of the tire side wall 15. This transition is dynamic as the tire casing side wall 15 flexes during vehicle operation. A suitable plastic is polypropylene or the like, dyed to the desired coloration, and extruded in a continuous length that is cut off, as shown in FIG. 2, to a usable length adequate to circumscribe any diameter wheel for which its use is intended.

The bead portion is best shown in FIG. 3 of the drawings, preferably of round cross section and for example approximately ⅛ inch diameter.

The anchor portion C is a lateral curvilinear extension of the bead portion B, and is shaped to conform generally to the interfaced surfaces 17 and 18 hereinabove descibed. Accordingly, the anchor portion C is comprised of a fin member 19 having at least one longitudinally coextensive sharp anchor rib 20, and preferably a plurality of spaced parallel ribs 20, projecting from the inner facing side 21 thereof which opposes the outer surface 17 of the tire bead portion 14. The fin member 19 terminates short of the seat 12, as shown.

As shown in FIG. 4 of the drawings, the side wall 15 of the tire T is manipulated away from the flange surface 18, whereby a space is is temporarily established to receive the anchor portion C inserted therein as shown. In carrying out this invention the tire T is deflated for this installation proceedure, by removing the valve core V.

Having prepared the wheel W and mounted tire T for the trim attachment installation, and referring to FIG. 1, the anchor portion C is progressively inserted into the aforementioned space between surfaces 17 and 18 in a clockwise direction (or counter clockwise if so desired), until the free end portion 22 overlaps the initially inserted butt end 23. The bead portions B are then brought closely together and the free end portion 22 marked and cut off as is indicated, whereupon the cut end is inserted so as to continue in alignment with the butt end 23. The trim attachment A now appears as a continuous ring with the decorative bead portion B exposed for its color line and ornamental value.

Having described only the typical preferred form and application of my invention, I do not wish to be limited or restricted to the specific details herein set forth, but wish to reserve to myself any modifications or variations that may appear to those skilled in the art as set forth within the limits of the following claims.

I claim:

1. A decorative trim attachment for installation between a vehicle wheel rim flange and outside surface of the bead of a tire casing mounted thereon, and including;
    a flexible member of elongated uniform cross sectional configuration to be cut to a length circumscribing the wheel rim and having a bead portion and an anchor portion,
    the bead portion being of enlarged cross section for exposure at the juncture of the wheel rim flange and tire casing,
    and the anchor portion being of thin cross section for insertion between the wheel rim flange and the outside surface of the tire casing.

2. The decorative trim attachment as set forth in claim 1, wherein the bead portion is a small diameter enlargment presenting a visible line of demarcation between the wheel rim and the tire casing.

3. The decorative trim attachment as set forth in claim 1, wherein the anchor portion is a thin fin member conforming to opposed surfaces of the wheel rim flange and outside surface of the bead of the tire casing.

4. The decorative trim attachment as set forth in claim 1, wherein the anchor portion is a thin fin member of generally curvilinear cross section conforming to opposed surfaces of the curvilinear cross section of the wheel rim flange and outside surface of the bead of the tire casing.

5. The decorative trim attachment as set forth in claim 3, wherein the anchor portion has at least one coextensive rib for depression into a conforming outside surface of the bead of the tire casing.

6. The decorative trim attachment as set forth in claim 4, wherein the anchor portion has at least one coextensive rib for depression into a conforming outside surface of the bead of the tire casing.

7. The decorative trim attachment as set forth in claim 1, wherein the bead portion is a small diameter enlargement presenting a visible line of demarcation between the wheel rim and the tire casing, and wherein the anchor portion is a thin fin member conforming to opposed surfaces of the wheel rim flange and outside surface of the bead of the tire casing.

8. The decorative trim attachment as set forth in claim 1, wherein the bead portion is a small diameter enlargement presenting a visible line of demarcation between the wheel rim and the tire casing, and wherein the anchor portion is a thin fin member of generally curvilinear cross section conforming to opposed surfaces of the curvilinear cross section of the wheel rim flange and outside surface of the bead of the tire casing.

9. The decorative trim attachment as set forth in claim 1, wherein the bead portion is a small diameter enlargement presenting a visible line of demarcation between the wheel rim and the tire casing, wherein the anchor portion is a thin fin member conforming to opposed surfaces of the wheel rim and tire casing, and wherein the anchor portion has at least one coextensive rib for depression into a conforming outside surface of the bead of the tire casing.

10. The decorative trim attachment as set forth in claim 1, wherein the bead portion is a small diameter enlargement presenting a visible line of demarcation between the wheel rim and the tire casing, wherein the anchor portion is a thin fin member of generally curvilinear cross section conforming to opposed surfaces of the curvilinear cross section of the wheel rim and tire casing, and wherein the anchor portion has at least one coextensive rib for depression into a conforming outside surface of the bead of the tire casing.

11. In combination with a vehicle wheel having a rim with a radial flange continuing from a bead seat upon which a mounted tire casing bead is seated and from which a side wall of the tire casing flares outwardly and upwardly from opposed curvilinear surfaces of the wheel rim flange and tire casing bead,
- a decorative trim attachment engaged between the opposed curvilinear surfaces of the wheel rim flange and tire casing bead, and including;
- a flexible member of elongated uniform cross sectional configuration cut to a length circumscribing the wheel rim and having a bead portion and an anchor portion,
- the bead portion being of enlarged cross section exposed at the juncture of the wheel rim and tire casing,
- and the anchor portion being of thin cross section for insertion between the opposed surfaces of the wheel rim and tire casing.

12. The decorative trim attachment as set forth in claim 11, wherein the bead portion is a small diameter enlargement presenting a visible line of demarcation between the wheel rim and the tire casing.

13. The decorative trim attachment as set forth in claim 11, wherein the anchor portion is a thin fin member conforming to the opposed curvilinear surfaces of the wheel rim and tire casing bead.

14. The decorative trim attachment as set forth in claim 11, wherein the anchor portion is a thin fin member of generally curvilinear cross section conforming to the opposed curvilinear surfaces of the curvilinear cross section of the wheel and tire casing bead.

15. The decorative trim attachment as set forth in claim 13, wherein the anchor portion has at least one coextensive rib for depression into the curvilinear surface of the tire casing bead comforming thereto.

16. The idecorative trim attachment as set forth in claim 14, wherein the anchor portion has at least one coextensive rib for depression into the curvilinear surface of the tire casing bead conforming thereto.

17. The decorative trim attachment as set forth in claim 11, wherein the head portion is a small diameter enlargement presenting a visible line of demarcation between the wheel rim and the tire casing, and wherein the anchor portion is a thin fin member conforming to the opposed cuvilinear surfaces of the wheel rim and tire casing bead.

18. The decorative trim attachment as set forth in claim 11, wherein the bead portion is a small diamter enlargement presenting a visible line of demarcation between the wheel rim and the tire casing, and wherein the anchor portion is a thin fin member of generally curvilinear cross section conforming to the opposed curvilinear surfaces of the curvilinear cross section of the wheel rim and tire casing bead.

19. The decorative trim attachment as set forth in claim 11, wherein the bead portion is a small diameter enlargement presenting a visible line of demarcation between the wheel rim and the tire casing, wherein the anchor portion is a thin fin member conforming to opposed curvilinear surfaces of the wheel rim and tire casing, and wherein the anchor portion has at least one coextensive rib for depression into the curvilinear surface of the tire casing bead conforming thereto.

20. The decorative trim attachment as set forth in claim 11, wherein the bead portion is a small diameter enlargement presenting a visible line of demarcation between the wheel rim and the tire casing, wherein the anchor portion is a thin fin member of generally curvilinear cross section conforming to the opposed curvilinear surfaces of the curvilinear cross section of the wheel rim and tire casing conforming thereto, and wherein the anchor portion hasa at least one coextensive rib for depression into the curvilinear surface of the tire casing bead conforming thereto.

* * * * *